United States Patent [19]
Hill et al.

[11] Patent Number: 5,643,693
[45] Date of Patent: Jul. 1, 1997

[54] BATTERY-MOUNTED POWER DISTRIBUTION MODULE

[75] Inventors: Mark G. Hill, Novi; Eric J. Stern, Farmington Hills, both of Mich.

[73] Assignee: Yazaki Corporation, Tokyo, Japan

[21] Appl. No.: 550,367

[22] Filed: Oct. 30, 1995

[51] Int. Cl.$^6$ .................................................. H01M 2/20
[52] U.S. Cl. ............................ 429/121; 429/65; 429/123
[58] Field of Search ................................. 429/7, 65, 121, 429/123

[56] References Cited

U.S. PATENT DOCUMENTS

| | | | |
|---|---|---|---|
| 4,769,295 | 9/1988 | Kudo et al. | 429/121 X |
| 5,389,462 | 2/1995 | Lin | 429/121 |
| 5,503,642 | 4/1996 | Lippert et al. | 429/65 X |

FOREIGN PATENT DOCUMENTS

| | | |
|---|---|---|
| 64-48848 | 3/1927 | Japan . |
| 63-182048 | 11/1988 | Japan . |
| 64-19260 | 1/1989 | Japan . |
| 64-19261 | 1/1989 | Japan . |
| 64-19259 | 1/1989 | Japan . |
| 64-48850 | 3/1989 | Japan . |
| 64-48849 | 3/1989 | Japan . |
| 64-48865 | 3/1989 | Japan . |
| 64-48869 | 3/1989 | Japan . |

*Primary Examiner*—Stephen Kalafut
*Attorney, Agent, or Firm*—Young & Basile, P.C.

[57] ABSTRACT

An electrical power distribution module for use with an automotive vehicle electrical system is adapted to be mounted on the top surface of a standard automotive lead-acid storage battery and connect with a battery terminal extending therefrom. The power distribution module includes a battery post connecting assembly for housing a terminal connector for making electrical connections with the battery terminal and alternator and starter cables, a fuse block for receiving a plurality of fuses associated with separate vehicle electrical circuits, and a harness guide channel for routing a plurality of wires which connect the fuses with their associated circuits. The power distribution module is mounted to lay flat on top of the battery's upper surface with the battery terminal extending upwardly into the module to be engaged by the battery terminal connector. The module does not extend substantially above the highest point of the battery terminal, nor does it extend laterally substantially outside of the battery perimeter. A cover is attached to the power distribution module and has hinged sections which may be opened to provide access to the battery terminal connector and the fuse receptacles.

16 Claims, 10 Drawing Sheets

BATTERY-MOUNTED POWER DISTRIBUTION MODULE

FIELD OF THE INVENTION

The present invention relates to electrical power distribution module for use in automotive vehicles, and more particularly to a power distribution module which is mounted on top of a vehicle battery.

BACKGROUND OF THE INVENTION

Automotive vehicle electrical systems typically operate on direct current supplied by an engine-driven alternator in combination with a lead-acid storage battery. The alternator and the battery are connected to various circuits for the different electrically powered components of the vehicle. Conventionally, the circuits are provided with protection from over-current conditions by fuses, at least some of which are located in a fuse box mounted in the vehicle engine compartment. To reduce the amount and complexity of electrical wiring in the engine compartment, the fuse box is preferably placed close to the battery.

Several prior art fuse boxes are mounted directly to the battery. One example of such a fuse box is disclosed in Japanese Utility Model Preliminary Publication No. 63-182048. The fuse box houses a plurality of fuses which plug into a bus bar which extends from the box and bent is to form a strap which is mechanically and electrically connected to the battery terminal or post. An additional mechanical connection with the battery is provided by a mounting arm extending from the fuse box and secured to one of the battery solution inlet caps. Most of the weight of the fuse box is supported by the battery post, giving rise to the possibility that the battery post may be overstressed and battery fluids may leak from the battery around the post.

A second battery mounted fuse box is taught by Japanese Utility Model Preliminary Publication No. 64-19261 in which the battery is formed with a notch in its upper surface and a fuse box is provided with locking arms which engage the notch to support the fuse box in a position alongside the battery. A connecting strap extends between the battery post and the bus bar housed inside the fuse box, but mechanical loads and stresses are transferred to the body of the battery via the locking arms rather than directly to the battery post. This construction reduces the likelihood of leakage around the battery post, but it does not lend itself to general application since a specially designated battery having an appropriately shaped notch is required.

Both of the above-described fuse boxes are mounted adjacent the side surface of the battery and thus require that additional lateral space for the box be provided when it is installed in the vehicle. In some automotive applications, particularly in small vehicles, lateral space in the vehicle engine compartment is at a great premium and there may not be sufficient room for such a side battery mounting. Further, even if the battery installation does permit room for a side-mounted fuse module, the location of the battery within the engine compartment may force the fuse box to be positioned in a place which is difficult to reach if it is necessary to replace fuses or perform other maintenance involving the fuse box.

SUMMARY OF THE INVENTION

According to the present invention, a battery-mounted, fuse-protected electrical power distribution module is provided for use with an automotive vehicle battery having a substantially horizontal top surface. The power distribution module includes a battery terminal connector for making electrical contact with a battery terminal and a plurality of fuse receptacles electrically connected with the battery terminal. The power distribution module is mounted to the battery so as to be positioned essentially against and over the battery top surface and is low-profile so as to extend only marginally above the battery terminals. The module is compatible with standard battery designs, imposes no adverse load on the battery terminals, provides access to automotive fuses, and makes efficient use of space in the battery-mounting area.

According to another feature of the invention, the power distribution module is designed to fit substantially within the perimeter of the battery top surface, and when mounted to a battery having an upwardly projecting battery terminal to extend only slightly higher than the highest point of the battery terminal. This results in a very compact mounting.

According to a further feature of the invention, a bus bar electrically connecting the battery terminal connector to the fuse receptacles lies in a substantially horizontal plane in close proximity to the battery top surface. This is important in achieving the low profile design of the power distribution module as mentioned above.

According to still another feature of the invention, the power distribution module includes means for electrically connecting a starter cable with the battery terminal connector and an alternator cable with the bus bar. By integrating into the power distribution module the connections for these other electrical system components, the power distribution module is easily installed in a vehicle.

According to yet another feature of the invention, the power distribution module includes means for mounting a high-current fuse between the alternator cable and the bus bar, thereby providing a convenient and protected installation for the fuse which protects the vehicle electrical system against short circuit conditions.

According to yet another feature of the invention, the fuse receptacles which make up the fuse module portion of the power distribution module are arranged in a horizontal row substantially parallel with and in close proximity to the battery top surface, and are oriented such that fuses are inserted therein in a horizontal direction.

According to a still further feature of the invention, the power distribution module includes a wire harness guide channel through which are routed a plurality of wires connected with the fuse receptacles. The guide channel routes these wires over the top surface of the battery and keeps them in a compact, protected bundle.

According to another feature of the invention, the power distribution module further includes a cover having at least two separately openable hinged portions, one portion opening to allow access to the battery terminal connector and another opening to allow access to the fuse receptacles. The cover thereby provides substantial protection against harmful contaminants and against shorting, while allowing convenient access to the terminal and fuse receptacles when necessary for maintenance.

According to yet another feature of the invention, the electrical power distribution module when mounted to the battery substantially encloses the battery terminal, thus protecting the terminal from corrosive materials as well as from contact with other objects which might cause electrical shorting.

DETAILED DESCRIPTION OF THE PREFERRED EMBODIMENT

Figure 1:
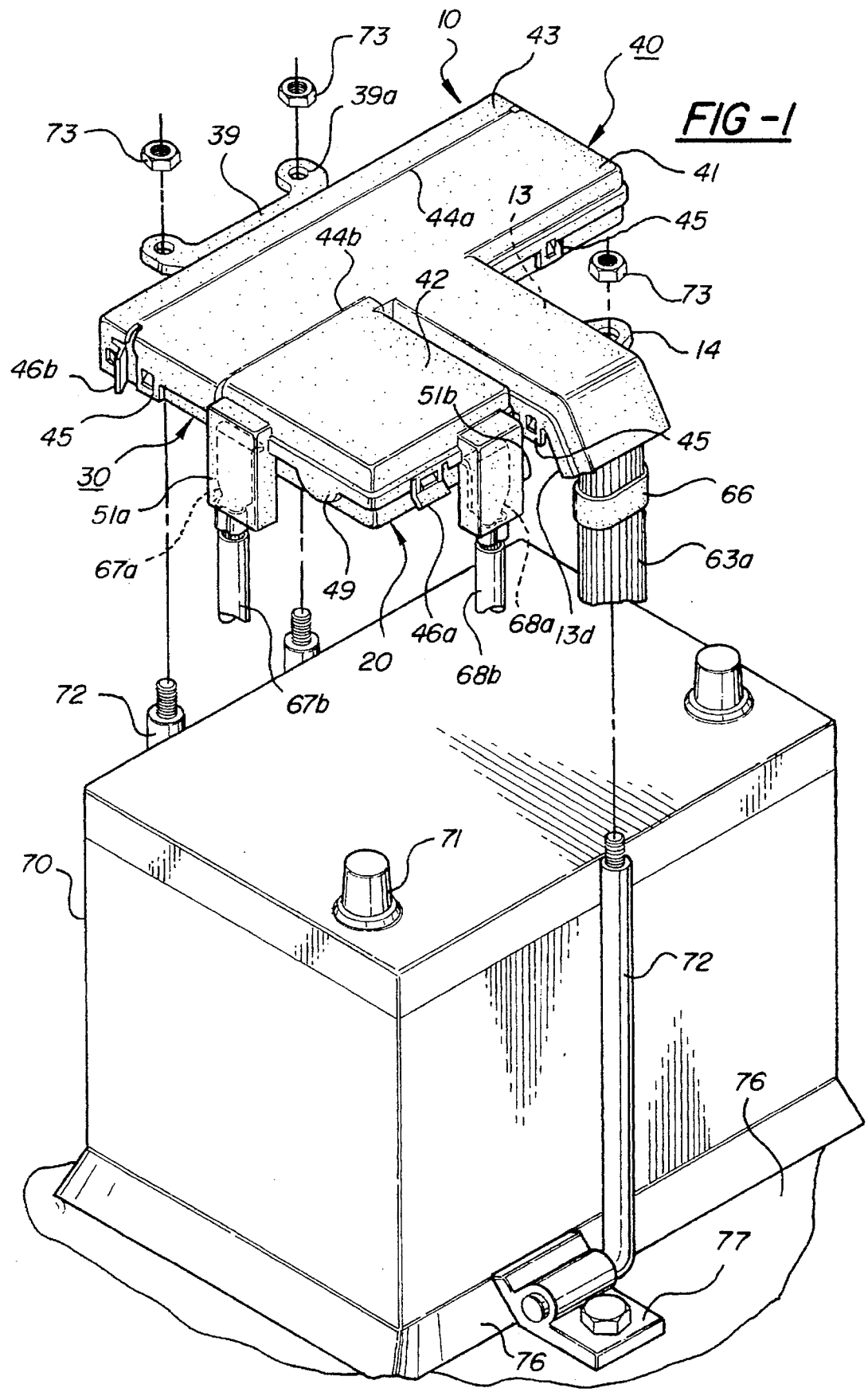
FIG. 1 is a perspective view of a power distribution module according to the invention immediately prior to being mounted to a battery.
Figure 2:
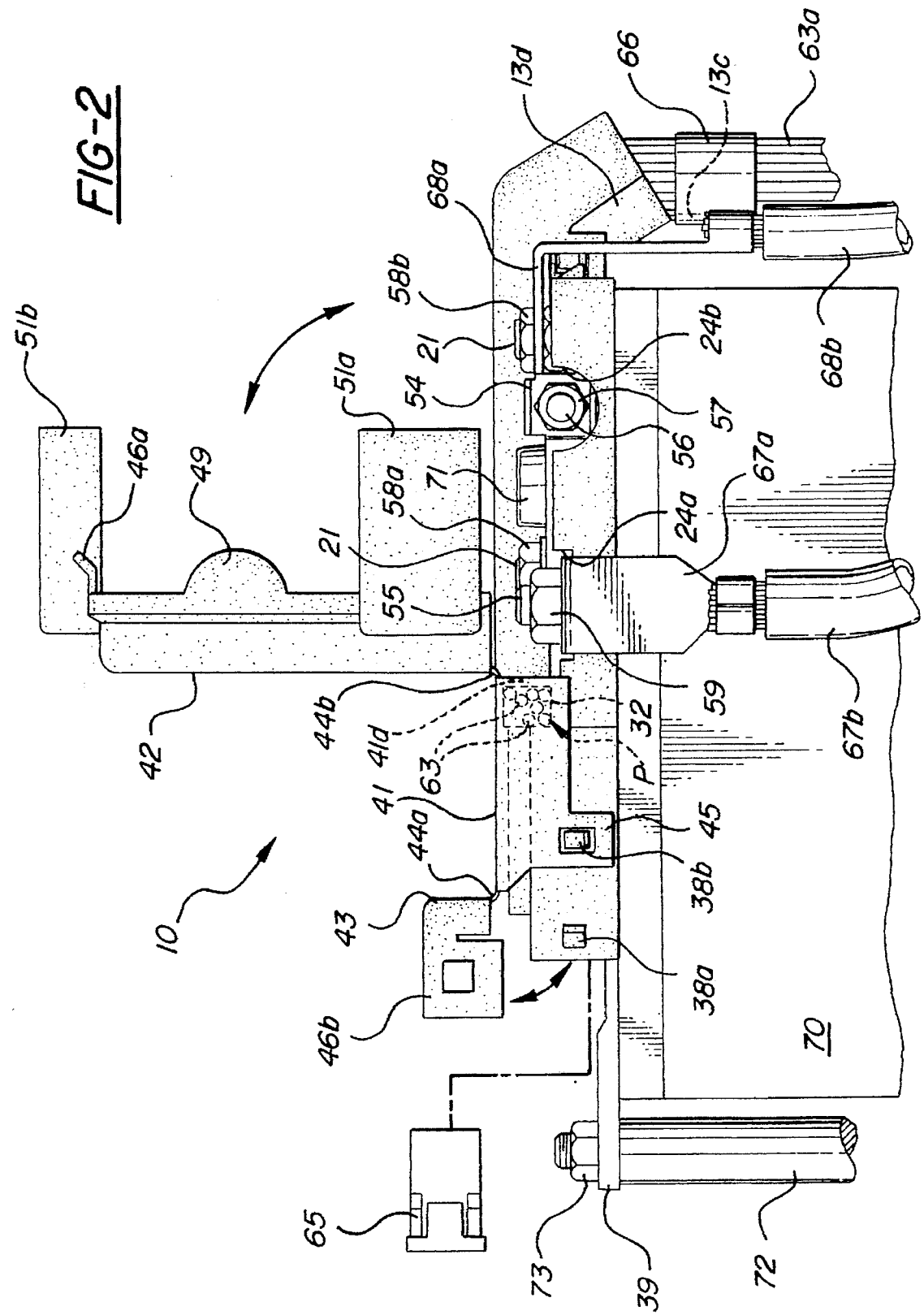
FIG. 2 is a side view of the power distribution module of FIG. 1 mounted to a battery.
Figure 3:
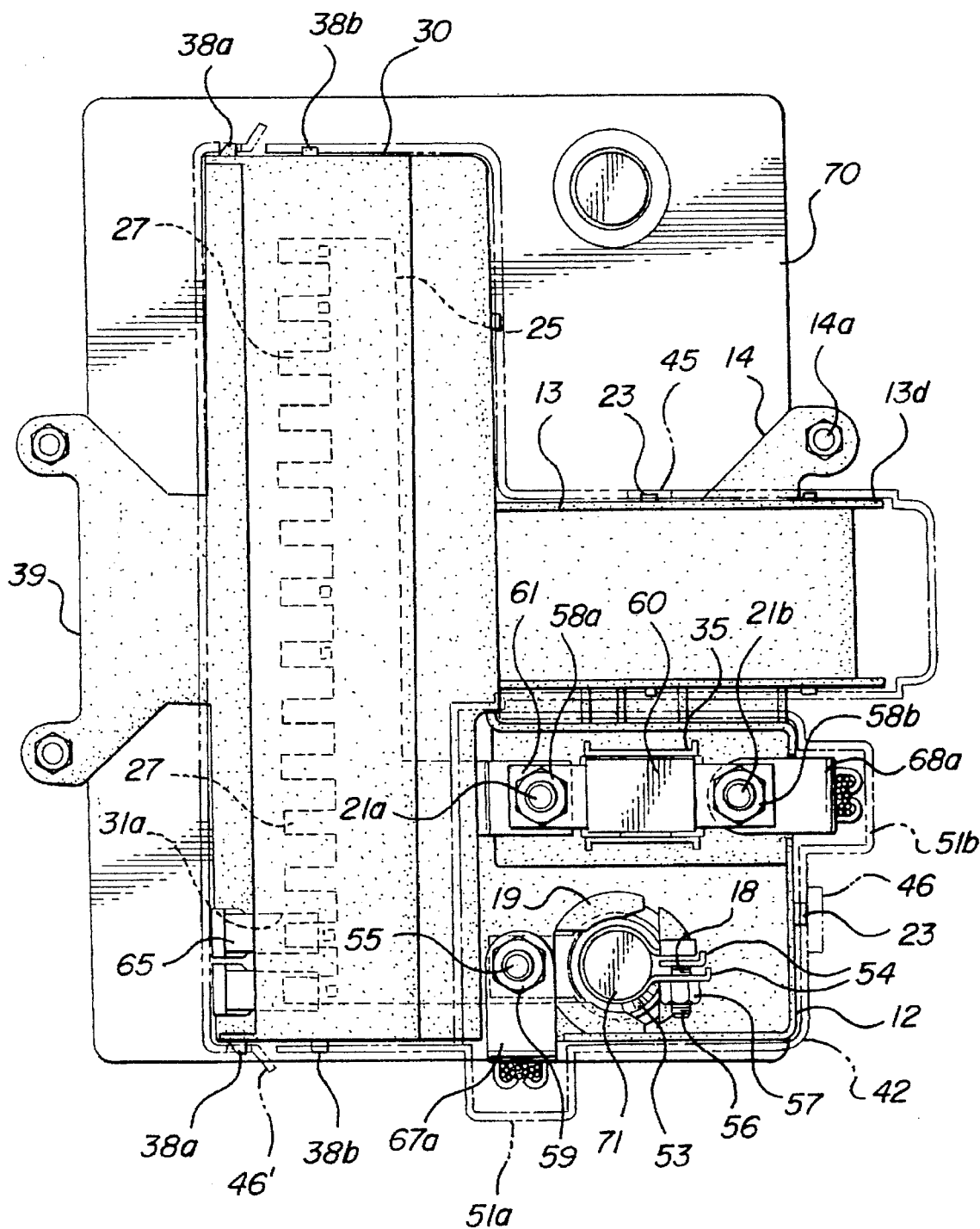
FIG. 3 is a top view of the power distribution module of FIG. 1.

Referring to FIGS. 1–3, a low-profile, battery-top power distribution module 10 is an essentially unitary, closed plastic structure which overlies the vehicle battery 70 and is held against or immediately adjacent the top surface of the battery by clamping bolts 72 and nuts 73. The module comprises a bottom shell which is divided into blocks 20 and 30 and a unitary top shell 40 which snaps into the bottom shell to enclose the internal components. The internal divisions of the bottom shell define a battery connecting block 20 and a fuse block 30 enclosing a bus bar terminal 25 and fuses 65. Mounting bolts 72 pass through holes formed in a plastic fuse block flange 39 and a harness guide flange 14 and are secured with nuts 73. While the module 10 appears to function as a battery hold-down clamp, it is not normally manufactured to have the structural strength required for this purpose. Battery hold-down is, therefore, performed by clamps 77 which act on bevelled base 76.

The module 10 is essentially L-shaped as shown in FIG. 3 and covers only battery terminal 71; the opposite polarity terminal is left exposed for normal cable connection. Terminal 71, however, extends upwardly into assembly 12 in the bottom shell 20,30 for purposes to be described. The height of module 10 is only marginally greater than the height of terminal 71.

Figure 4:
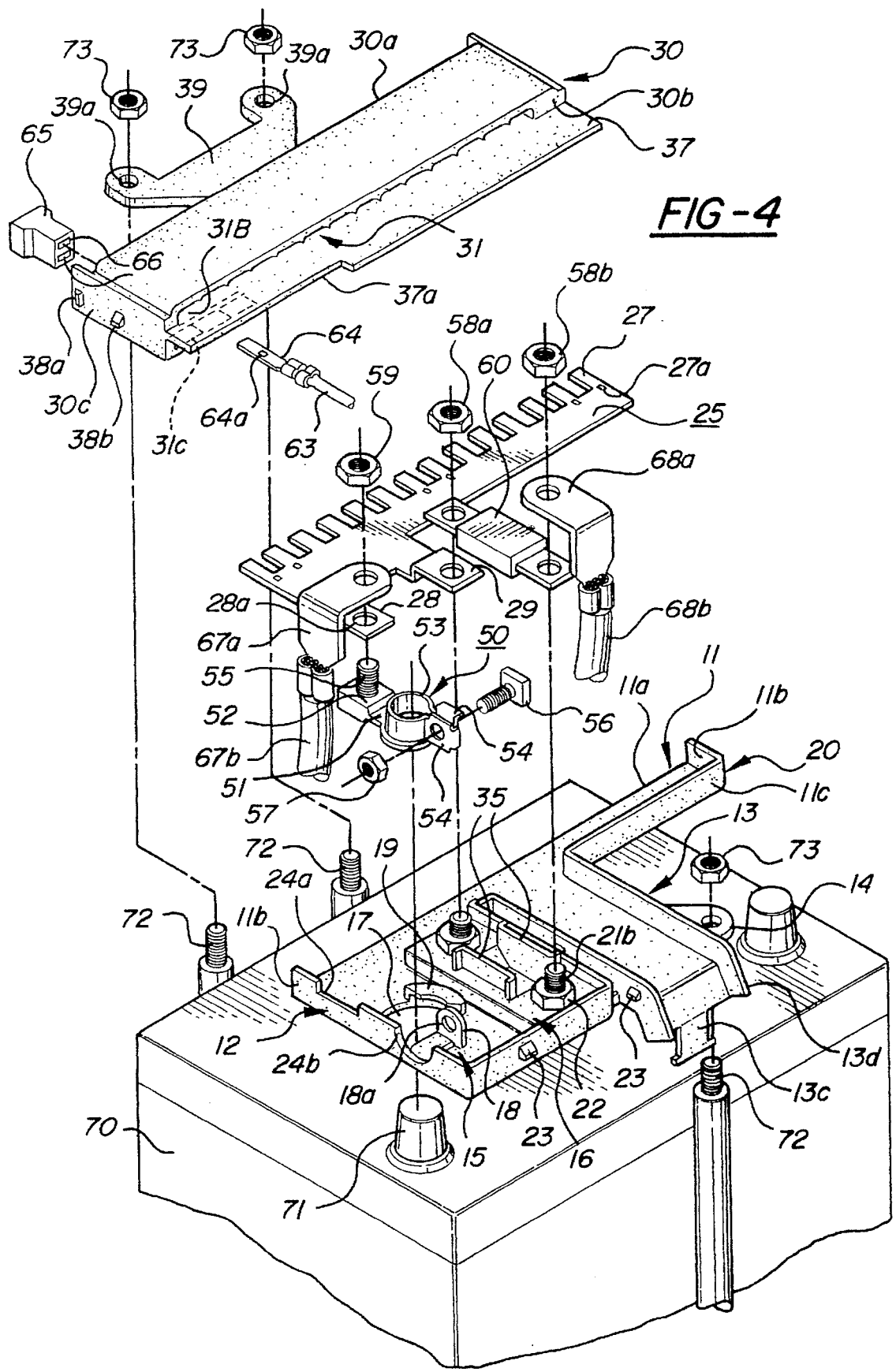
FIG. 4 is an exploded view of the power distribution module of FIG. 1 with the cover removed.
Figure 5:
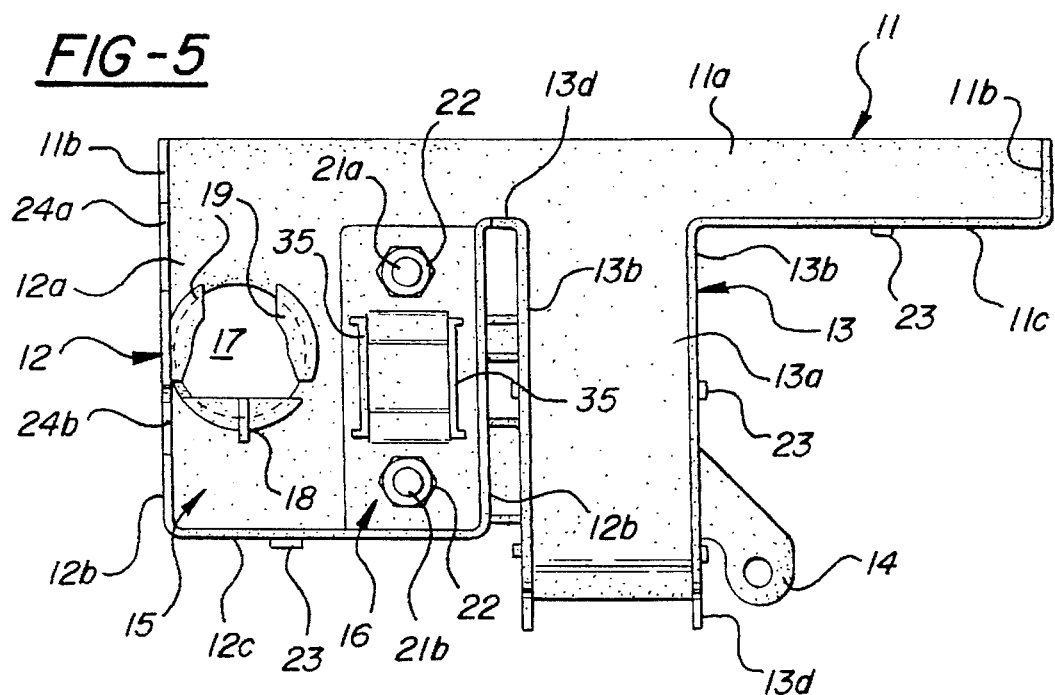
FIG. 5 is a top view of the battery connecting block of the invention power distribution module.

Battery connecting block 20 comprises an electrically non-conductive case preferably made of an injection molded synthetic resin. As shown in FIGS. 4 and 5, battery connecting block 20 includes a terminal guide 11 extending along the rear of the block, a battery terminal connecting assembly 12 disposed at one end of terminal guide 11, and a harness guide channel 13 extending adjacent to post connecting assembly 12. Terminal guide 11 includes left and right side walls 11b, a front wall 11c, and an elongated bottom plate 11a which is of the same length as fuse block 30.

Battery terminal connecting assembly 12 is closed at three sides, with left and right side walls 12b, a front wall 12c, and a bottom plate 12a extending from and contiguous with bottom plate 11a of terminal guide 11.

Harness guide channel 13 includes left and right side walls 13b, and a bottom plate 13a extending from and contiguous with bottom plate 11a of terminal guide 11 to describe a T-shape. Harness guide channel 13 has a downwardly sloped harness outlet 13d from which a harness holder 13c extends vertically downward. Mounting flange 14 projects from right side wall 13b and has a hole formed therein.

Battery terminal connecting assembly 12 is divided into a raised fuse mounting section 16 and a battery terminal section 15. Battery terminal section 15 is formed with a hole 17 in the bottom wall through which battery terminal 71 extends when power distribution module 10 is mounted on battery 70. A terminal connector positioning plate 18 with a hole 18a projects upward from bottom plate 12a adjacent to hole 17. A pair of terminal connector positioning flanges 19 are arranged on opposite sides of hole 17. Fuse mounting section 16 is provided with a pair of parallel, upwardly projecting fuse holding walls 35 and a pair of bolts 21 also extend upwardly near the ends of walls 35, with fuse seat nuts 22 threaded onto bolts 21. Battery connecting block 20 is formed with locking projections 23 on walls 11c, 12c, and 13b, which projections engage locking straps 45, 46 on cover 40 as hereinafter described. Side wall 12b is formed with a shallow, elongated cut-out 24a and a semi-circular cut-out 24b.

Conductive metal bus bar 25 has a plurality of spaced tabs 27 extending from one side thereof, and a fuse connecting terminal 29 and a battery connecting terminal 28 extending from the opposite side thereof. Terminals 28 and 29 have holes 28a and 29a respectively formed therein. Fuse connecting terminal 29 has a step 29b located so that the terminal will extend over the raised fuse mounting area 16. Each of the tabs 27 has a locking hole 27a.

Figure 6:
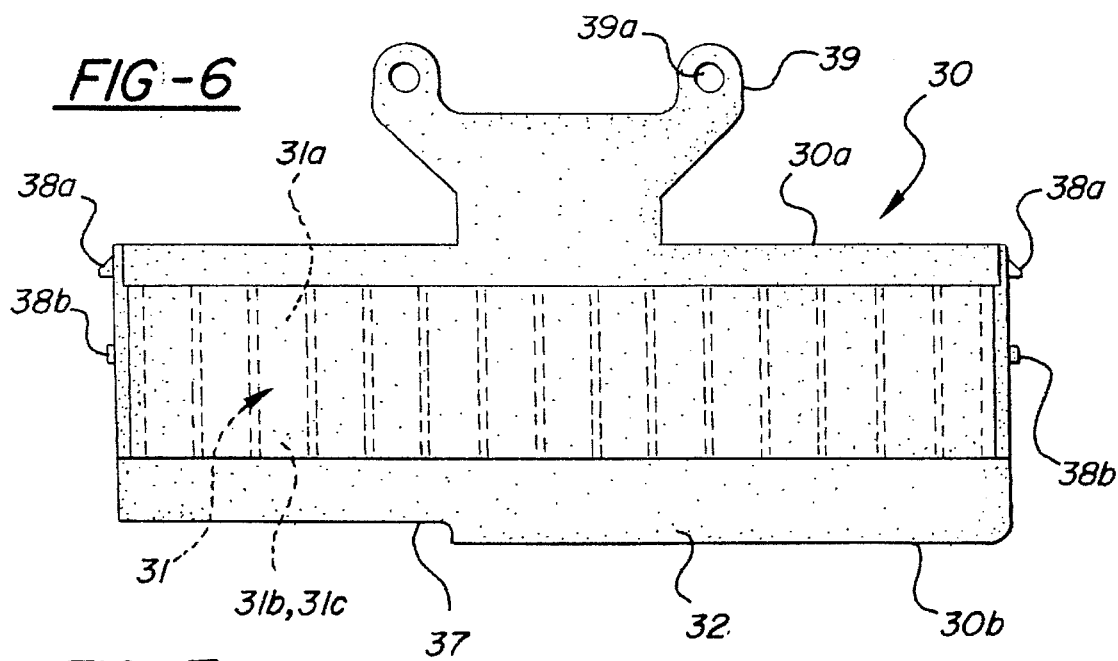
FIG. 6 is a top view of the fuse block portion of the invention power distribution module.
Figure 7:
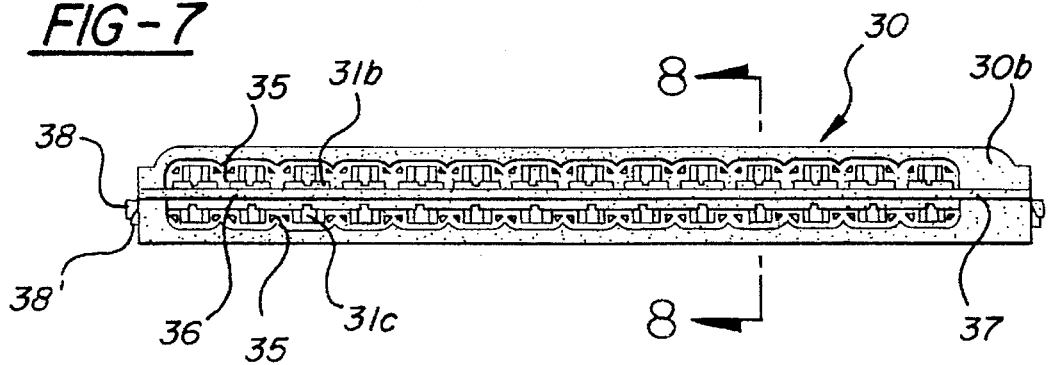
FIG. 7 is a front view of the fuse block of FIG. 6.
Figure 8:
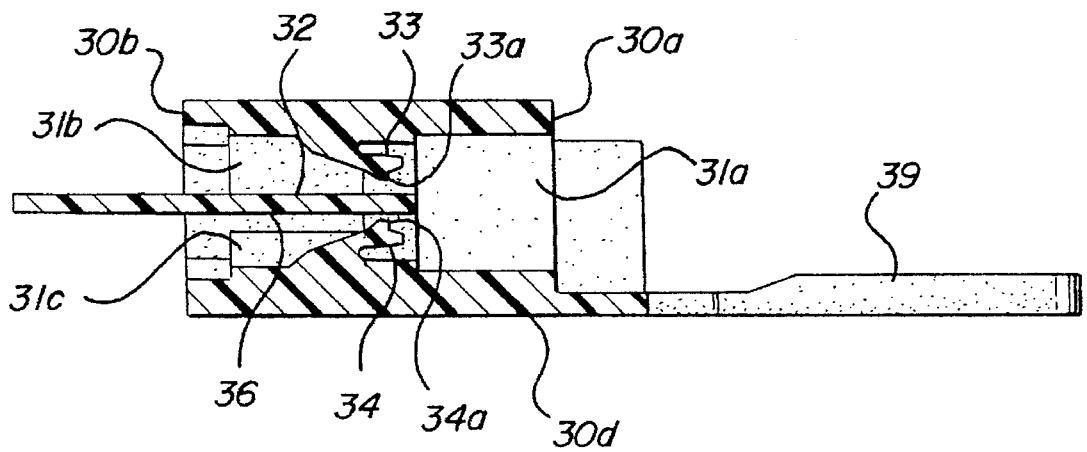
FIG. 8 is a cross-sectional view taken along the line 8—8 of FIG. 7.

Referring now to FIGS. 6–8, fuse block 30 is a generally rectangular and also made of an electrically non-conductive synthetic resin, and has a plurality of fuse receptacles 31a formed therein along a forward end 30a. Each fuse receptacle 31a communicates with a load-side terminal cavity 31b and a tab cavity 31c formed along a rearward end 30b of fuse block 30. A horizontal wall 32 separates the load-side terminal cavities 31b from the tab cavities 31c, with the former located above the latter. As best seen in FIG. 8, resilient locking arms 33, 34 are molded to extend from fuse block 30 into cavities 31b, 31c respectively, and have locking projections 33a, 34a at their tips. A horizontal slit 36 extends longitudinally along fuse block 30, passing through the walls separating tab cavities 31c from one another and opening to the rearward end 30b of block 30. Bus bar 25 is inserted into fuse block 30 so that it is seated in slit 36 with tabs 27 extending forwardly into the lower portions of fuse receptacles 31a.

Horizontal wall 32 extends from fuse block rearward end 30b, and the end portion of the wall adjacent battery connecting block 20 has a cut-out 37 formed therein so that the step 29b of power distributing terminal 25 clears wall 32. Locking projections 38a and 38b project from the left and right side walls 30c of fuse block 30. Mounting flange 39 is contiguous with a fuse block bottom wall 30d, projecting from the front side of the fuse block and having a pair of holes 39a.

Figure 9:
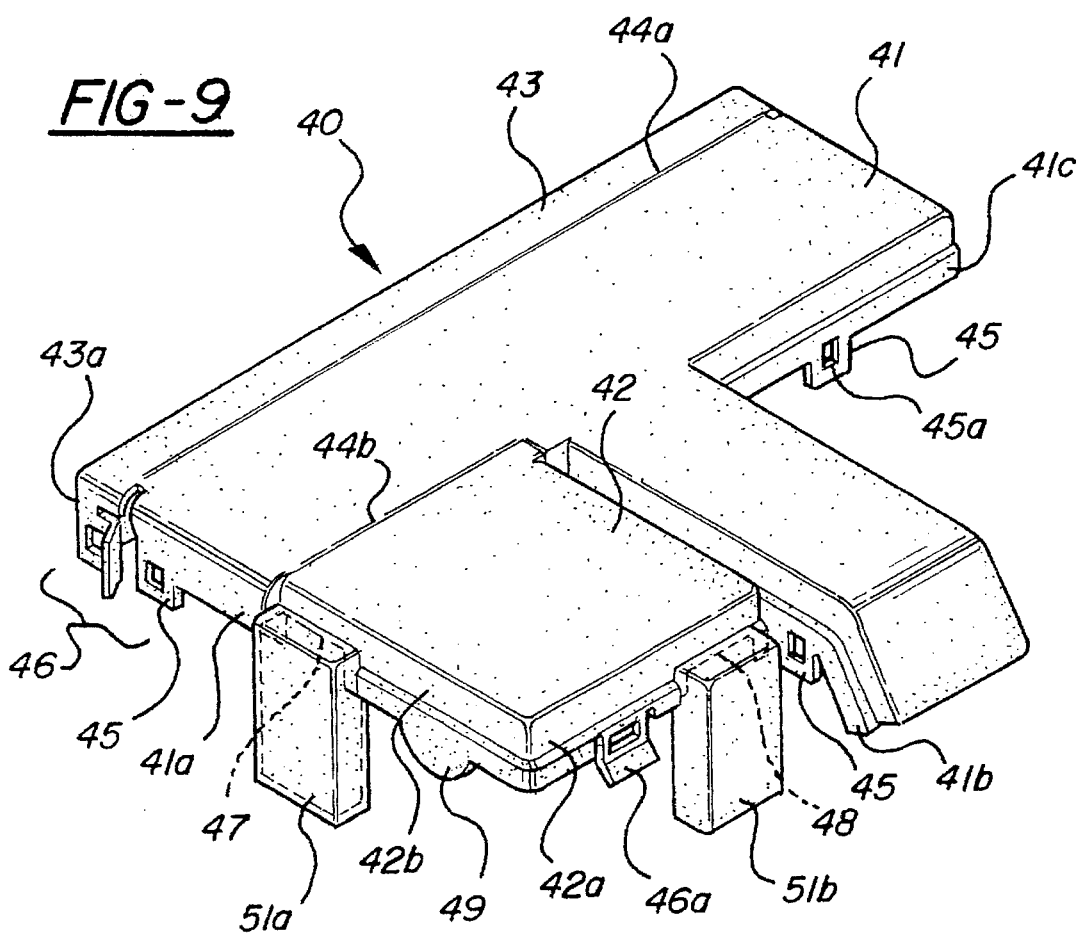
FIG. 9 is a perspective view of a power distribution module cover according to the present invention.

As shown in FIGS. 1, 2 and 9, cover 40 includes as integral portions a main body 41, a battery terminal cover portion 42, and a fuse cover portion 43. Battery terminal cover portion 42 is made pivotal relative to body 41 by a living hinge, a narrow strip of material located between and formed integrally with the two portions and which is thinner than the structure to either side so as to form a flexible hinge line. Fuse cover portion 43 is made pivotal relative to main cover body 41 by living hinge 44a. When cover 40 is fitted over battery connecting block 20 and fuse block 30, body 41 is fixed and covers harness guide channel 13 and most of fuse block 30. Hinged cover portion 43 provides access to the ends of the fuses for placement and replacement purposes. Cover portion 42 provides access to the battery terminal clamp 53 and the main fuse 60. Locking straps 45 extend from peripheral walls 41a, 41b and 41c of body 41 and have holes that engage locking projections 38b and 23 on fuse block 30 and battery connecting block 20 respectively. As best seen in FIG. 2, an inner wall 41d projects downward from the inner side of body 41 and extends adjacent battery post cover 42 to define a path along which harness wires 63 run between wall 32 and fuse block 30.

Figure 14:
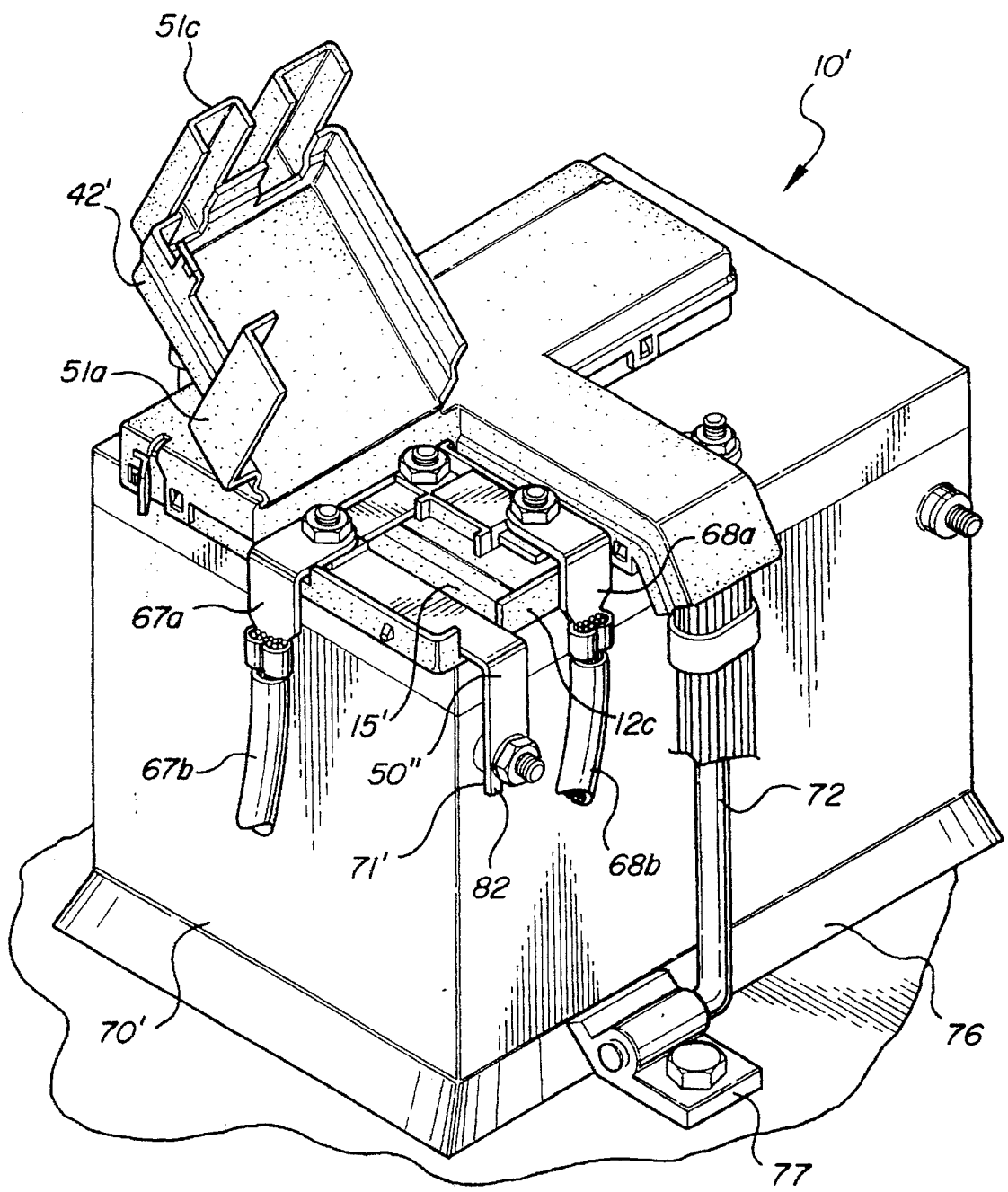
FIG. 14 is a perspective view of a power distribution module according to the present invention mounted to a battery having terminals extending from its side.

Battery terminal cover portion 42 and fuse cover portion 43 are formed with locking straps 46a and 46b respectively to engage locking projections 23 and 38a and hold the covers in their closed positions. Battery terminal cover portion 42 has a front peripheral wall 42a which is formed with a shallow, elongated cut-out 48 to permit passage of a later described L-shaped terminal 68a, and a cable terminal cover 51b extends out from post cover 42 over cut-out 48. Cover 42 also has a shallow cut-out 47 which aligns with cut-out 24 in battery terminal connecting assembly side wall 12b when the cover is in its closed position, and a cable terminal cover 51a projects outward and downward from the cover. While cable terminal cover 51b has a C-shaped cross section so as to surround terminal 68a when cover 42 is closed, cable terminal cover 51a has an L-shaped cross section, as best seen in FIG. 14,' so that it will not strike terminal 67a when cover 42 is moved between the open and closed positions. A semi-circular tab 49 also extends downwardly from side wall 42b to engage cut-out 24b in wall 12b when the cover is closed.

Figure 10:
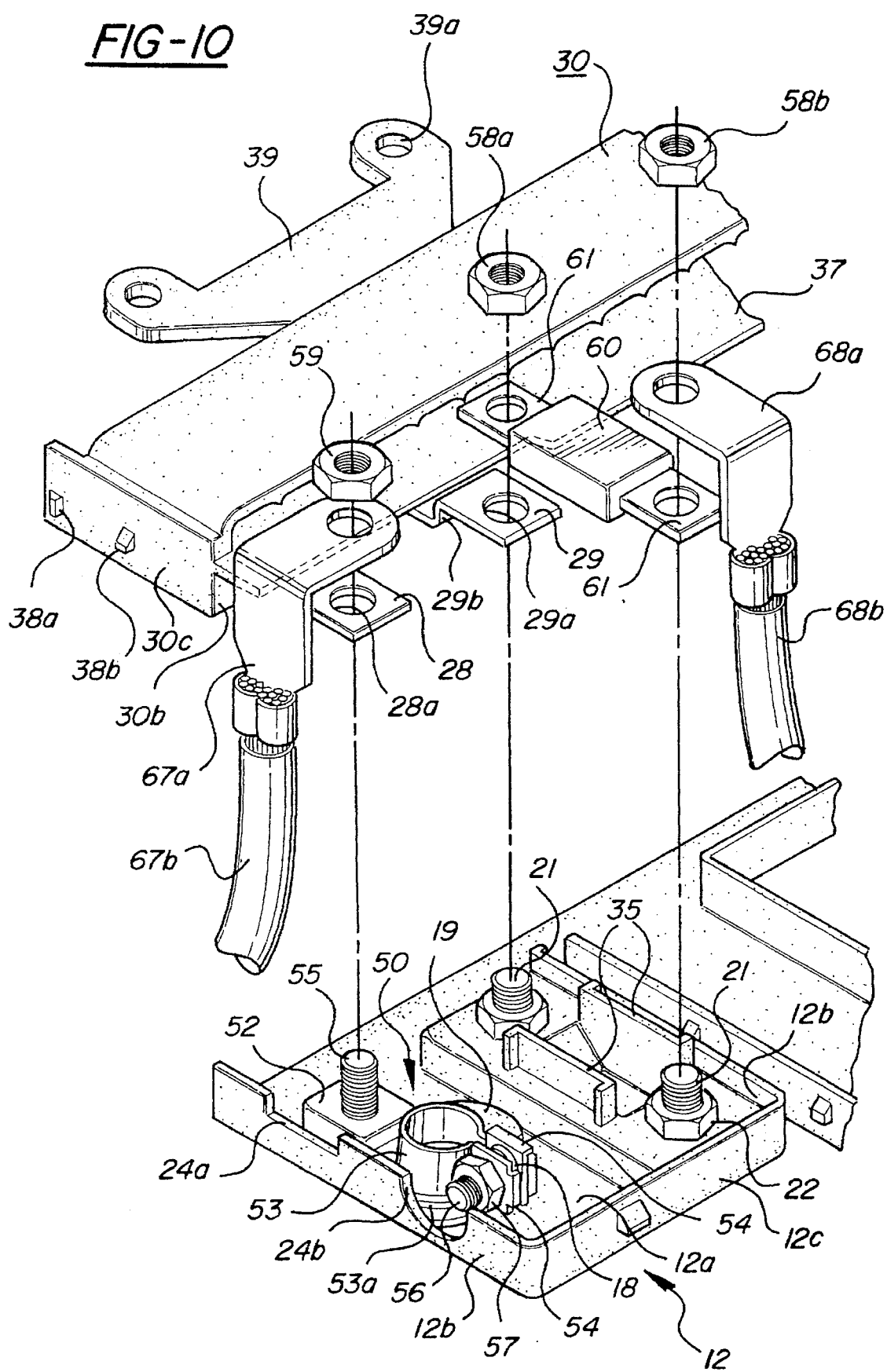
FIG. 10 is an exploded view of a portion of the invention power distribution module showing stages of the assembly of the fuse block and battery connecting block.
Figure 11:
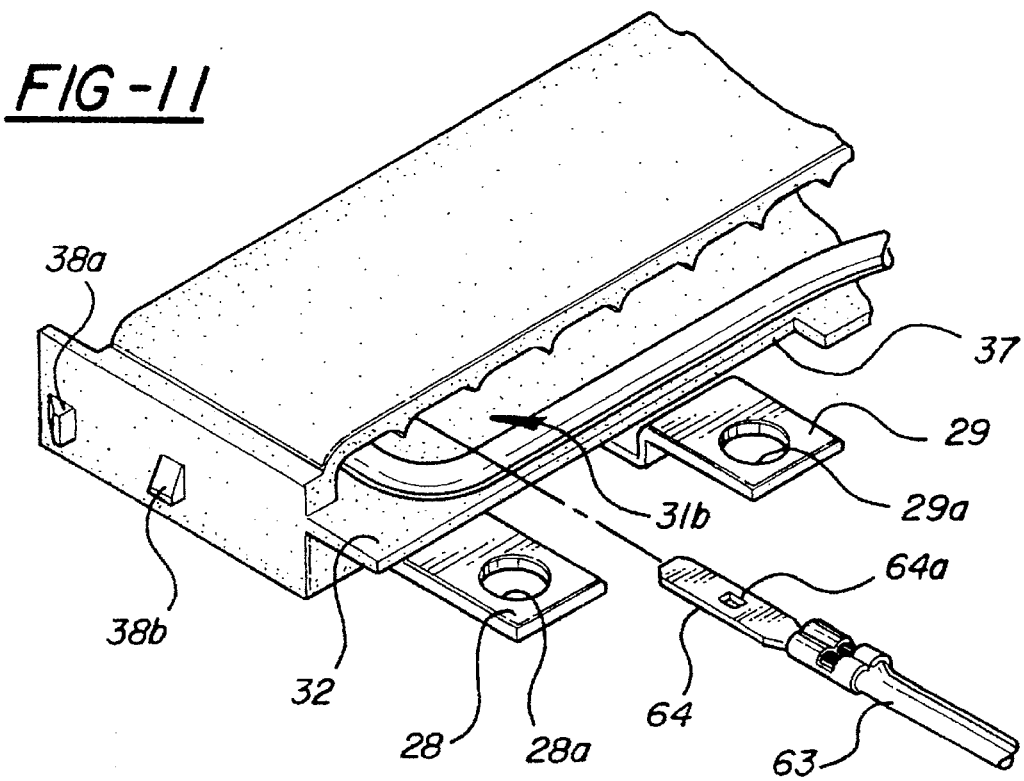
FIG. 11 is a partial view of the fuse block of the invention power distribution module with load-side terminals being inserted therein.

As shown in FIGS. 10 and 11, power distribution module 10 is assembled by first inserting bus bar 25 into fuse block 30 from the rear side 30b, placing the bus bar in slit 36 beneath horizontal wall 32. Each of the tabs 27 projects into the corresponding cavity 31c and projections 34a of resilient locking arms 34 engage the corresponding locking hole 27a of each tab 27 to lock bus bar 25 in position.

A battery terminal connector 50 is preliminarily positioned in battery terminal area 15 of battery terminal connecting assembly 12. As shown in FIGS. 4 and 10, battery terminal connector 50 comprises a cable terminal connection 52 and a C-shaped battery terminal clamp 53. Straps 54 extend from the free ends of clamp 53 and holes 54b pass through the straps. Cable terminal connection 52 holds an upwardly extending bolt 55.

Battery terminal clamp 53 is first placed on bottom plate 12a such that terminal connector positioning plate 18 extends upward inside of clamp 53. Clamp 53 is then moved away from terminal connector positioning tab 18 until a flange 53a formed around the bottom of clamp 53 slides underneath terminal connector positioning flanges 19 and terminal positioning plate 18 is between straps 54. A bolt 56 is then inserted through holes 54b in straps 54 and hole 18a in terminal connector positioning plate 18, and a nut 57 is loosely threaded onto the bolt.

A high current fuse 60 is next mounted in fuse mounting area 16 by placing holes in fuse tabs 61 over bolts 21a, 21b and pushing downward on the fuse until it is retained between walls 35 and on top of fuse seat nuts 22. High current fuse 60 is of the type commonly used in the automotive industry to protect a vehicle electrical system from short circuit conditions such as would be caused, for example, if an un-fused alternator cable were to contact an electrical ground. Battery connecting block 20 is then assembled to fuse block 30 so that bolt 55 of battery terminal connector 50 extends through hole 28a in battery connecting terminal 28 and bolt 21a of fuse mounting area 16 extends through hole 29a in fuse connecting terminal 29. Nuts 59, 58 are then threaded onto bolts 55, 21a respectively to secure terminals 28 and 29.

As shown in FIG. 11, load-side terminals 64 have locking holes 64a and are crimped to wires 63. Load-side terminals 64 are inserted into tab cavities 31b where locking holes 64a are engaged by locking projections 33a of locking arms 33 (as shown in FIG. 8). Wires 63 are routed along the upper surface of horizontal wall 32 and then outwardly through guide channel 13, with the bundled wires 63 forming a wiring harness 63a which is lashed to harness holder 13c by an elastic strap 66 or the equivalent (see FIG. 2).

Conventionally known fuses 65 are inserted into fuse receptacles 31a from fuse block front side 30a, with one of two female fuse terminals of fuse 65 receiving tab 27 and the other receiving load-side terminal 64.

Figure 12:
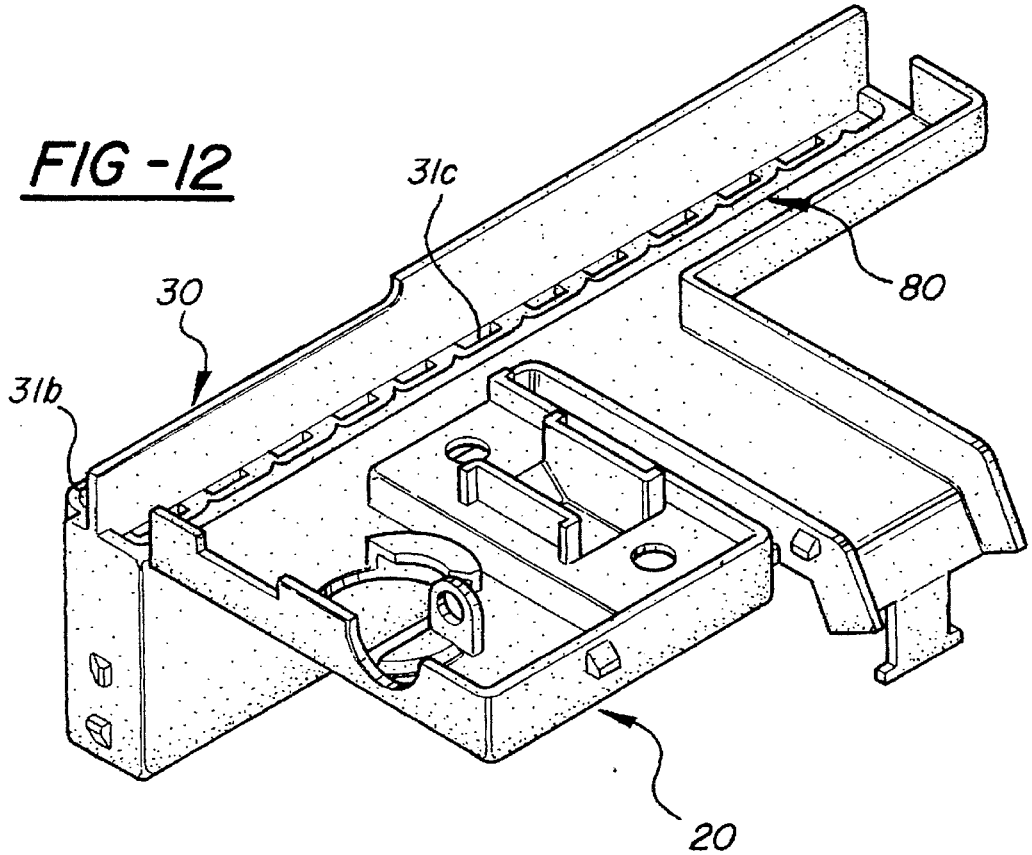
FIG. 12 is a perspective view of a one-piece molded fuse block and battery connecting block according to the present invention.

As an alternative to forming battery connecting block 20 and fuse block 30 as two separate pieces, the two blocks may be molded as an integral unit connected by a living hinge 80 as shown in FIG. 12. Hinge 80 is necessary because it is impractical to mold the two blocks in a co-planar unit. Rather, the unit is more advantageously molded with battery connecting block 20 and fuse block 30 at 90° to one another as seen in FIG. 12, thereby permitting the formation of cavities 31b and 31c. Blocks 20 and 30 are then bent about living hinge 80 during assembly of the power distribution module, placing them in a co-planar orientation with one another. Such one-piece construction is more economical to manufacture than two separate pieces and simplifies assembly of the power distribution module.

Referring again to FIG. 2, cover 40 is placed over the battery connecting block 10 and fuse block 30, and locking straps 45 engage locking projections 23 and 38b to firmly connect cover body 41 to blocks 20 and 30. Terminal cover 42 and fuse cover 43 are locked in their closed positions by locking straps 46a and 46b respectively in a similar manner.

Power distribution module 10 is placed onto battery 70 with terminal cover 42 open, as shown in FIG. 2, so that battery terminal 71 extends upwardly through hole 17 into the battery terminal connecting assembly 12 to be encircled by battery terminal clamp 53 which has been preliminarily mounted in battery terminal area 15. Bolt 56 and nut 57 are now tightened to securely fasten clamp 53 to battery terminal 71.

As shown in FIG. 1, power distribution module 10 is secured to the vehicle body by mounting bolts 72. The lower ends of mounting bolts 72 engage battery hold-down means 77 which secure battery 70 to a battery mounting platform 76 attached to the vehicle body, and the upper ends of the mounting bolts pass through holes formed in fuse block flange 39 and harness guide flange 14 and are secured with nuts 73.

Nut 59 is disconnected from battery terminal bolt 55 and a starter cable terminal 67a is placed over battery terminal connector 50 and nut 59 is again threaded onto bolt 55 and tightened securely. Terminal 67a is connected with a starter cable 67b which supplies battery power to a conventional starter motor (not shown). Likewise, nut 58b is removed from bolt 21b and alternator cable terminal 68a is placed over bolt 21b on top of fuse terminal 61 and nut 58b is retightened. Terminal 68a is connected to an alternator cable 68b to allow current from an alternator (not shown) to charge battery 70 and be supplied to bus bar 25.

When fastened to power distribution module 10 as described above, cable terminals 67a and 68a extend outwardly from battery terminal connecting assembly 12, with starter cable terminal 67b passing through cut-out 24a in left side wall 12b and alternator cable terminal 68a passing over the top edge of front wall 12c. When terminal cover 42 is closed over battery connecting block 10 cable terminal covers 51a and 51b shield cable terminals 67a and 68a respectively to protect the terminals from moisture and dirt, and to prevent accidental contact with the terminals that could cause electrical shorting. When battery terminal cover 42 is closed, power distribution module 10 extends above the top of battery terminal 71 by an amount slightly greater than the thickness of the top surface of cover 42.

Figure 13:
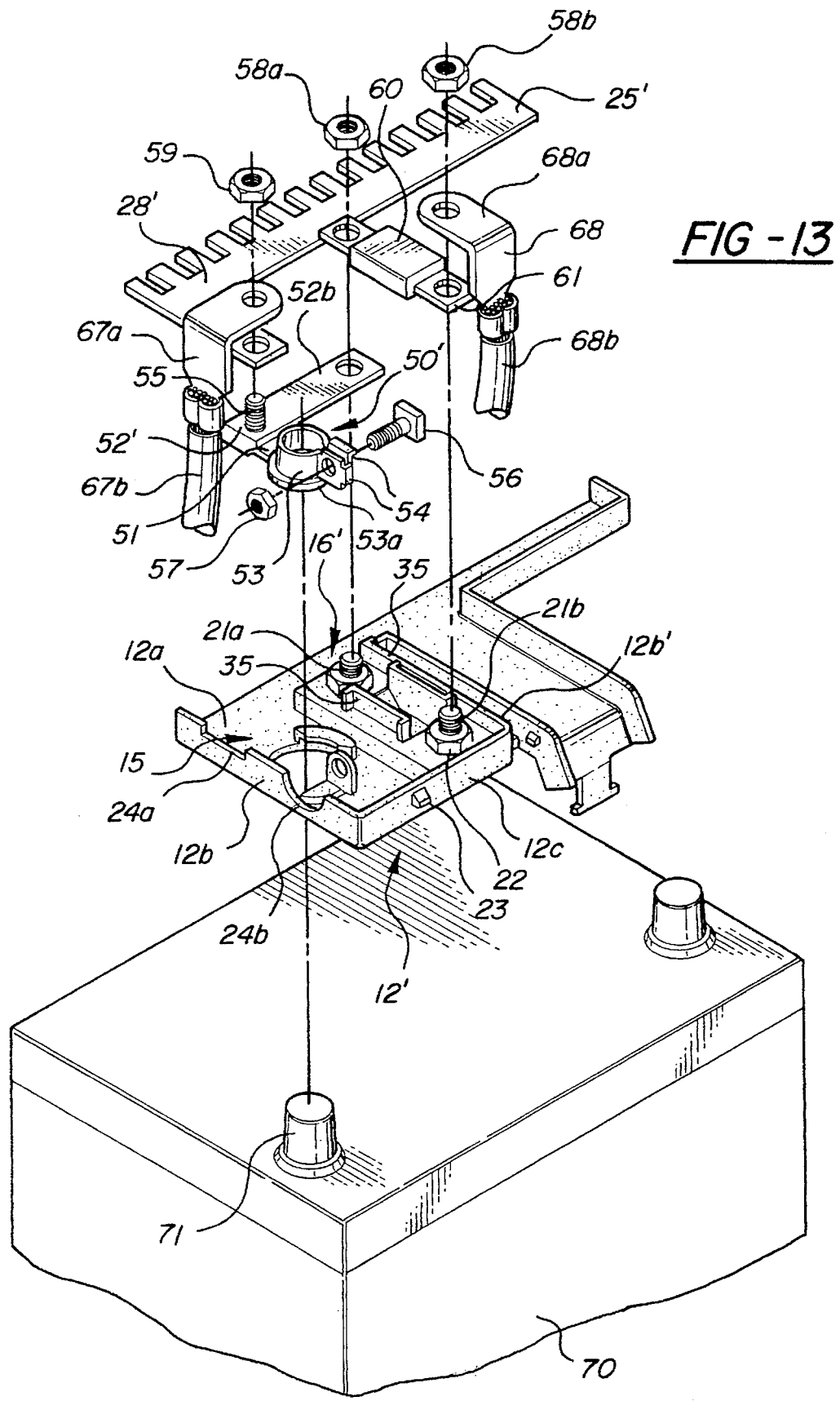
FIG. 13 is a partial exploded view of a second embodiment of a battery connecting block according to the present invention.

FIG. 13 illustrates a second embodiment of a battery terminal connecting assembly 12' differing from the above-described first embodiment in that fuse mounting section 16' is not raised with respect to battery terminal section 15, but rather the two sections are co-planar. A battery terminal connector 50' is of the same basic construction as battery terminal connector 50 of the first embodiment except that a fuse connecting jumper 52b extends laterally from cable terminal connection 52' to connect with bolt 21a. Because fuse connecting jumper 52b provides electrical connection between fuse 60 and battery terminal connector 50', bus bar 25' need be connected with battery terminal connecting assembly 12' only by means of battery connecting terminal 28'.

The integration of fuse connecting jumper 52b with battery terminal connector 50' facilitates assembly of the battery terminal connecting assembly 12' to battery 70 and also simplifies the construction of bus bar 25' by eliminating the stepped fuse connecting terminal 29 present in the first embodiment.

FIG. 14 illustrates a third embodiment of a power distribution module 10' according to the present invention for use on a battery 70' having a side-mounted battery terminal 71'. Power distribution module 10' is substantially identical to the module described above, except that contact with side battery terminal 71' is made by a battery terminal connector 50" extending out of battery terminal area 15' through a slot 82 formed in front wall 12c. Battery terminal connector 50" bends downward approximately 90° to engage battery terminal 71'. Battery terminal cover 42' has a battery terminal cover extension 51c to cover battery terminal 71' and battery terminal connector 50" when cover 42' is in the closed position.

Whereas the preferred embodiments of the invention have been illustrated and described in detail, it will be apparent that various changes may be made in the disclosed embodiments without departing from the scope or spirit of the invention.

The invention claimed is:

1. An electrical power distribution module for mounting to a vehicle battery having a substantially horizontal top surface and a battery terminal projecting from the top surface, the power distribution unit comprising:

a battery terminal connector for making electrical contact with the battery terminal and a plurality of fuse receptacles electrically connected with the battery terminal connector by a bus bar, characterized in that the power distribution module is adapted to be mounted in overlying relation to the battery top surface.

2. A power distribution module according to claim 1 characterized in that when mounted to the battery the power distribution module lies essentially within the lateral boundaries of the battery top surface.

3. A power distribution module according to claim 1 wherein the bus bar lies in a substantially horizontal plane.

4. A power distribution module according to claim 1 further including means for electrically connecting a starter cable with the battery terminal connector and an alternator cable with the bus bar.

5. A power distribution module according to claim 4 further including means for mounting a fuse between the alternator cable and the bus bar.

6. A power distribution module according to claim 1 wherein the fuse receptacles lie in a horizontal row substantially parallel with the battery top surface and are oriented such that fuses may be inserted horizontally therein.

7. A power distribution module according to claim 1 further including a wire harness guide channel for routing a plurality of wires connected with the fuse receptacles over the battery top surface.

8. A power distribution module according to claim 1 further including a cover having at least first and second separately openable hinged portions, the first hinged portion providing access to the battery terminal connector and the second hinged portion providing access to the fuse receptacles.

9. An electrical power distribution module for mounting to an automotive vehicle battery having a battery terminal with portions projecting therefrom, the power distribution module comprising:

a battery terminal connector for making electrical contact with the battery terminal and a plurality of fuse receptacles electrically connected to the battery terminal connector by a bus bar, characterized in that the power distribution module when mounted to the battery encloses the portions of the battery terminal projecting from the battery.

10. An electrical power distribution module adapted to be mounted above an automotive vehicle battery having a battery terminal projecting upward from a substantially horizontal top surface of the battery, the power distribution module comprising:

a battery connecting block positioned over the battery terminal and having a battery terminal connector for making electrical connection with the battery terminal, means for electrically connecting a starter cable and an alternator cable to the power distribution module, and fuse mounting means for mounting a main fuse in electrical connection between the alternator cable and the power distribution module;

a fuse block adapted to lie in a substantially horizontal plane above the battery top surface and having a plurality of horizontally oriented fuse receptacles and a bus bar electrically connecting the fuse receptacles with the battery terminal connector, the bus bar lying in a substantially horizontal plane;

a wire harness guide channel for routing a plurality of wires connected with the fuse receptacles over the battery top surface; and a cover for covering the battery connecting block, the fuse block, and the wire harness guide channel and having at least first and second separately openable hinged portions, the first hinged portion openable to allow access to the battery terminal connector and the second hinged portion openable to allow access to the fuse receptacles.

11. A battery-mounted, fuse-protected, automotive power distribution module comprising:

a housing of electrically non-conductive material having respective internal spaces for a battery terminal connector, a distribution bus bar and a plurality of fuses;

a battery terminal connector in the battery terminal connector space;

a bus bar disposed in the bus bar space and electrically connected to the battery terminal connector; and means for mounting the module in overlying relation to an automotive battery with a terminal of the battery extending upwardly into the battery terminal connector.

12. A battery-mounted, fuse-protected automotive power distribution module as defined in claim 11 wherein said housing includes a first cover portion for providing access to the battery terminal connector space.

13. A battery-mounted, fuse-protected automotive power distribution module as defined in claim 11 wherein said housing includes a second cover portion for providing access to said fuse space.

14. A battery-mounted, fuse-protected automotive power distribution module as defined in claim 11 further including a plurality of fuses mounted within said fuse space and means for electrically connecting said fuses to said distribution bus bar.

15. A battery-mounted, fuse-protected automotive power distribution module as defined in claim 11 wherein said means for mounting the module comprises a plurality of threaded clamping rods extending in mutually parallel relation through a portion of said housing, and threaded nuts engaging the end portions of said rods.

16. A power distribution module according to claim 1 wherein the battery terminal connector, the fuse receptacles, and the bus bar do not project above a highest point of the battery terminal.

* * * * *